March 13, 1945. G. GILLIVER 2,371,438
JOINING OF WIRES PARTICULARLY FINE WIRES USED
IN THE MANUFACTURE OF ELECTRIC COILS
Filed March 30, 1943 2 Sheets-Sheet 2
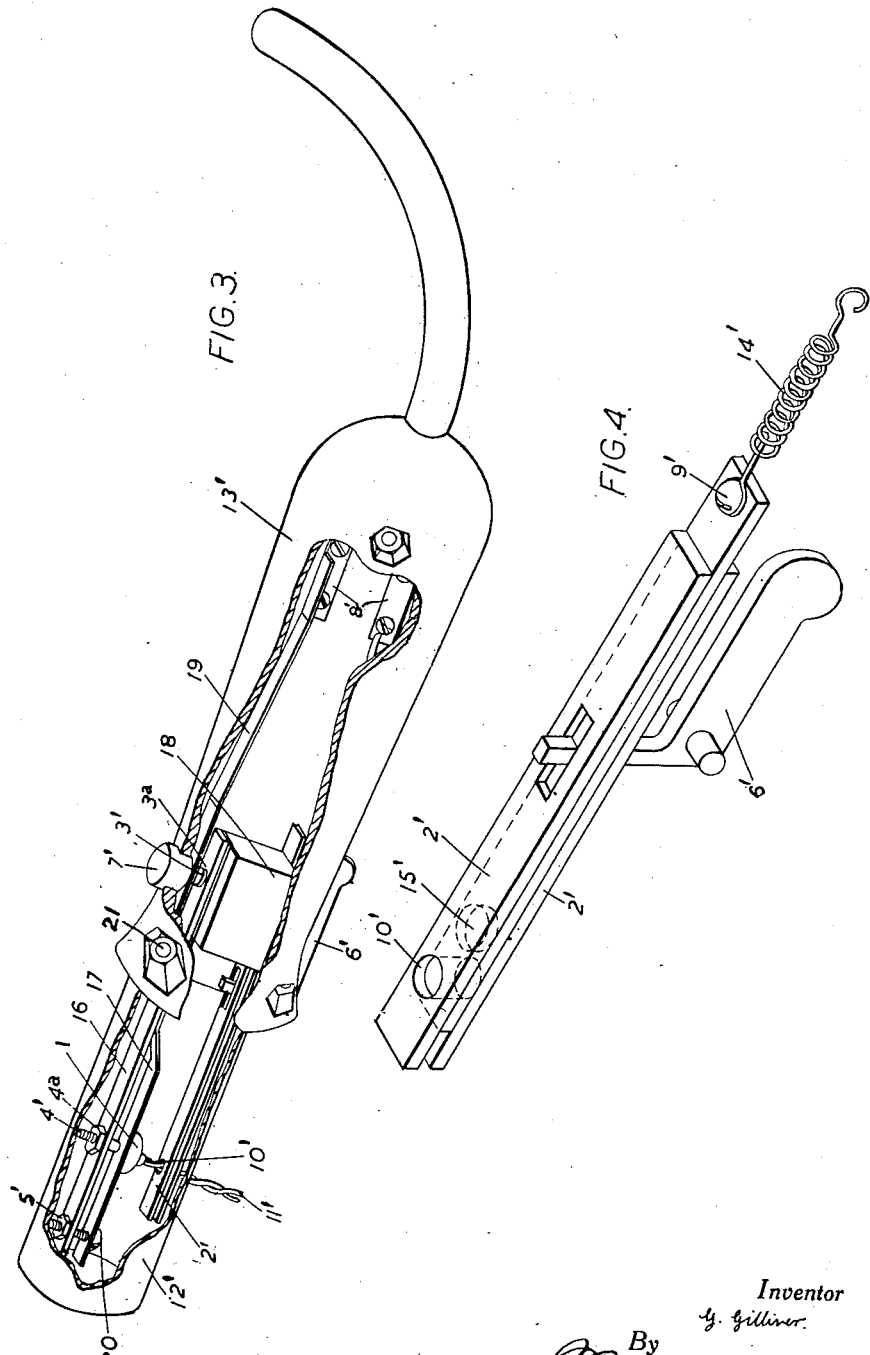
Inventor
G. Gilliver.
By
Attorney Patented Mar. 13, 1945

2,371,438

BEST AVAILABLE COPY

UNITED STATES PATENT OFFICE 2,371,438

JOINING OF WIRES, PARTICULARLY FINE WIRES USED IN THE MANUFACTURE OF ELECTRIC COILS

Gilbert Gilliver, London, England, assignor to Standard Telephones and Cables Limited, London, England, a company of Great Britain Application March 30, 1943, Serial No. 481,068
In Great Britain October 2, 1942

5 Claims. (Cl. 219—4)

This invention relates to improvements in the joining of wires and is an improvement in or modification of the invention described and claimed in British appln. No. 9,207/42. In that specification there was described and claimed the process of joining wires by electric fuse welding and an apparatus for carrying out the process comprising a pair of spaced electrodes, for example of carbon, across which the wires to be joined are bridged, means for clamping the wires against at least one of the electrodes and a circuit including an impedance for passing current through the wires. The present invention comprises improved forms of apparatus for carrying out such process.

According to one feature of the invention we provide an apparatus for joining wires by electric fuse welding comprising a casing, two spaced electrodes insulatingly mounted in said casing, a slot in said casing adapted to receive a pair of wires bridging said electrodes and a clamping piece carried by a lid for said casing and adapted on closing said lid to clamp said wires in bridging position. The eyes are thus shielded from the flash that occurs upon the closure of a circuit through the wires. The closure of said lid may operate means to connect an electric supply across said electrodes, or a separate press button can be operated to connect an electric supply across said electrodes when the lid is closed as, e. g. by being mounted in the lid.

According to another feature of the invention we provide an apparatus for joining wires by electric fuse welding comprising an electrode against which wires to be welded are adapted to abut, said electrode being mounted to be movable in the direction of length of said wires, means for holding said wires against said electrode and means for connecting one side of an electric supply to said electrode and another side of the supply to said wires at a point away from said electrode and means restricting the movement of said electrodes.

Figure 1:
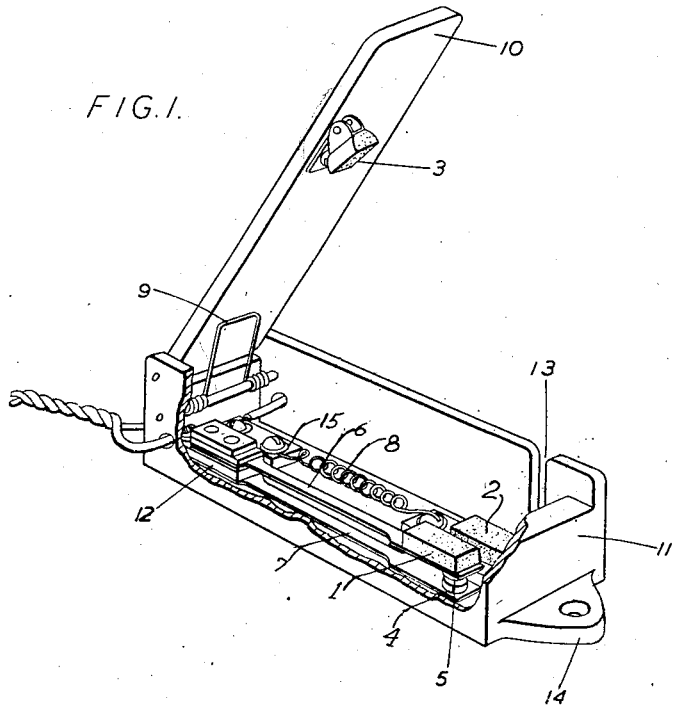
Figure 2:
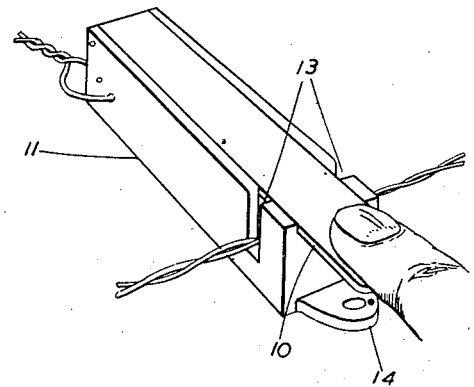

The invention will be better understood from the following description taken in conjunction with the accompanying drawings in which:

Figs. 1 and 2 show a bench apparatus for joining fine wires such as are used in electric relay coils and Figs. 3 and 4 show a hand tool for joining wires of a somewhat larger diameter than are used for relay coils.

Referring to the drawings and first to Figs. 1 and 2, Fig. 1 shows the apparatus ready for the insertion of a pair of wires, with a part of the casing broken away, whilst Fig. 2 shows the apparatus closed. 11 is a box-like casing of insulating material, provided with a hinged lid 10, normally held open by a spring 9. The casing 11 is provided with lugs 14 by means of which it may be screwed down upon a bench, and the lid 10 extends beyond the casing 11 as shown in Fig. 2 for easy manipulation by a finger of the user. On the bottom of the box is fixed a carbon electrode 2 connected through a resistance element 8 of a few ohms resistance to a contact block 15. Alongside the electrode 2 is a contact 4 connected by a metal blade 7 to a contact block 12. Mounted on contact block 12 but insulated therefrom is a spring metal blade 6 on the lower side of which is carried a contact 5 and on the upper side a carbon electrode 1. The lid 10 carries a block 3 which, when the lid is closed clamps down on electrode 1. Slots 13 are provided in the sides of the casing for insertion of wires to be welded and the electrodes 1 and 2 are in such position in relation to these slots that wires placed therein lie across the two electrodes. Contact blocks 12 and 15 are connected to a suitable electric supply, such as the secondary of a step-down transformer, the primary of which is connected to the mains.

This apparatus is suitable for use with wires from 30 s. w. g. down to 50 s. w. g. In use a pair of wires to be joined are twisted together, but it is unnecessary to cut the ends. The pair of wires is inserted in the slots 13 and the lid is closed with a finger. The block 3 clamps the pair of wires against electrode 1 and the pressure on this electrode closes contacts 4 and 5. The electric supply is thus connected between electrodes 1 and 2 and a current flows through the wires, melting the wires, producing a globule or bead uniting the wires and thus breaking the supply as described in specification No. 9,207/42. The closure of the lid thus holds the wires to be welded in position and switches on the supply. In addition it acts as an arc shield and shields the eyes of the operator from the flash produced.

The electrodes 1 and 2 and the block 3 are preferably made of carbon, but tungsten and other high melting metals may also be used.

Although the apparatus has been shown in a form adapted to be fixed to a bench it is clear that it could take other forms. For example it could be formed with a pistol handle and the lid 10 be closed by means of a trigger.

Figs. 3 and 4 show an apparatus which is suitable for use in electric fuse welding of wires of somewhat larger diameter than that for which the apparatus of Figs. 1 and 2 is used and is suitable for use with wires from 30 s. w. g. to 16 s. w. g. Fig. 3 shows the apparatus with parts of the casing and handle broken away and Fig. 4 shows a part to larger scale. A handle 13' carries two contact blocks 8' connected to a suitable electric supply. One of these blocks carries a metal blade 19 extending towards the front of the tool and carrying a button 7' extending outside the handle and a contact 3'. Under the contact 3' is mounted an insulating block 18 to which is fixed a metal member 16 carrying a spring blade 17. The member 16 carries a contact 3a immediately below but not normally touching contact 3'. The block 18 also carries a wire clamp shown on an enlarged scale in Fig. 4. This wire clamp consists of two fixed members 2' and a member 9' sliding between them. Apertures 10' are formed in the members 2' and an aperture 15', normally out of alignment with apertures 10', in member 9'. A trigger 6' is attached to member 9' and is adapted when actuated to move member 9' against a spring 14' to bring apertures 10' and 15' into alignment. The spring blade 17 carries a carbon electrode 1 opposite the apertures 10'. The blade 17 tends to move away from member 16 but its movement in this direction is restrained by a screw 20 which is screwed into member 16 and held therein by a nut 5' and passing through an aperture in blade 17. The movement of blade 17 towards member 16 is restricted by a screw 4' screwing into member 16 and held by a nut 4a. The lower contact block 8' is connected within the handle to member 2'.

A shroud 12' carried by the handle 13' surrounds members 16 and 2'. The handle 13' is made in two halves secured together by screws and nuts 21 fitting into recesses in one half.

In operation it is preferable to twist together the wires to be joined and to cut them off level. It is, however, not essential to twist the two wires together; they may be placed parallel and close together. The trigger 6' is then operated to bring aperture 15' in member 9' into alignment with apertures 10' and the wires 11' to be joined are inserted through the aligned apertures until they abut against electrode 1 and push it back as far as it will go. The trigger is then released and member 9' grips the wires against members 2'. Button 7' is then depressed and connects the electric supply through carbon electrode 1, the pair of wires, and members 2' and 9'. The weld is made, the ends of the wires against carbon electrode 1 fusing together and melting allowing the electrode 1 to move away from member 16 until stopped by screw 20, whereupon the circuit is broken by the wires being out of contact with electrode 1. Trigger 6' is actuated and the wires withdrawn.

The device shown in Figs. 3 and 4 is suitable for the fluxless welding of conductors in electric communication cables, and the like.

It is to be noted that the term wire is not restricted to circular wire, and may also include a flat thin strip of metal. Thus by the use of the apparatus described the wire of a coil winding may be welded to a strip of metal struck up from a terminal of the coil. Also another strip struck up from the same terminal may be welded to an external connecting wire. It is thus possible to produce an electrical equipment without any soldered joints, all joints being made by electrical fuse welding.

It is clear that the apparatus described with reference to Figs. 3 and 4 could be modified to form a bench fitting.

Either of the two forms of apparatus described is suitable for welding copper wires or resistance wires or copper wire to resistance wire, but brass, iron or aluminium wires require special treatment.

Joints produced by electric fuse welding have been found to possess a fine dendritic structure of the metal throughout the mass into which the two wires are fused and this mass is free from voids, whereas in gas welding the fused mass shows a coarse crystalline structure and includes many voids or gas pockets.

What is claimed is:

1. Apparatus for joining wires by electric fuse welding comprising a casing, two spaced electrodes insulatingly mounted in said casing, a circuit connection to the electrodes, a switch associated with one of the electrodes to be operated thereby, said casing having a slot adapted for reception of wires bridging said electrodes, a lid pivotally carried by the casing and having a clamping piece in position to engage the wires whereby closing of the lid simultaneously clamps the work on the electrodes, effects closing of the switch and protectively encloses the weld.

2. A device for joining wires by electric fuse welding comprising a casing, two spaced electrodes insulatingly mounted in said casing, circuit connections thereto, a resilient support for one of said electrodes, normally open switch contacts positioned to underlie the resiliently supported electrode to be closed thereby, a slot in the casing for the reception of the wires bridging the electrodes, a lid pivotally carried by the casing and a clamping member carried by the lid and adapted to effect clamping pressure on the wires with simultaneous depression of the resiliently supported electrode for closing of the circuit.

3. A device for joining wires by electric fuse welding comprising a casing, two spaced electrodes insulatingly mounted in said casing, circuit connections thereto, a resilient support for one of said electrodes, normally open switch contacts positioned to underlie the resiliently supported electrode, a slot in the casing for the reception of the wires bridging the electrodes, a lid pivotally carried by the casing, resilient means operative normally to open the lid and clamping means carried by the lid and adapted upon closing of the lid to effect clamping pressure on the wires and thereby to depress the resiliently supported electrode for closing of the circuit and said lid being formed with a handle extension.

4. A device for joining wires by electric fuse welding comprising an elongated casing, two spaced electrodes insulatingly mounted in said casing at one end thereof, a resilient support for one of said electrodes, an impedance coil in the circuit to the other of said electrodes, normally open switch contacts positioned to underlie the resiliently supported electrode to be closed thereby, transversely aligned slots in the casing wall for the reception of wires in bridging relation to the electrodes, a lid pivotally secured to the casing at the opposite end from the electrodes, resilient means engaging the lid normally to retain it in open position and a pivotally supported clamping shoe carried by the lid in position to engage the wires for clamping thereof and by pressure thereon to simultaneously depress the resiliently supported electrode to effect closing of the circuit.

5. A device for joining wires by electric fuse welding comprising an elongated casing, two spaced electrodes insulatingly mounted in said casing at one end thereof, a resilient support for one of said electrodes, an impedance coil in the circuit to the other of said electrodes, normally open switch contacts positioned to underlie the resiliently supported electrode to be closed thereby, transversely aligned slots in the casing wall for the reception of wires in bridging relation to the electrodes, a lid pivotally secured to the casing at the opposite end from the electrodes, resilient means engaging the lid normally to retain it in open position and a pivotally supported clamping shoe carried by the lid in position to engage the wires for clamping thereof and by pressure thereon to simultaneously depress the resiliently supported electrode to effect closing of the circuit.

GILBERT GILLIVER.